US009914214B1

(12) United States Patent
Strauss et al.

(10) Patent No.: US 9,914,214 B1
(45) Date of Patent: Mar. 13, 2018

(54) PRESHAPING FOR UNDERACTUATED FINGERS

(71) Applicant: X Development LLC, Mountain View, CA (US)

(72) Inventors: Marc Strauss, Fremont, CA (US); David Youmans, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 51 days.

(21) Appl. No.: 15/049,815

(22) Filed: Feb. 22, 2016

(51) Int. Cl.
*B25J 9/16* (2006.01)
*B25J 15/02* (2006.01)

(52) U.S. Cl.
CPC ......... *B25J 9/1633* (2013.01); *B25J 15/0206* (2013.01)

(58) Field of Classification Search
CPC .................. B25J 9/1633; B25J 15/0206; B25J 9/0012–9/0015; B25J 9/1617; B25J 15/0028; B25J 15/0009; Y10S 901/31; Y10S 901/39; G05B 2219/39124; B23P 19/007; B65H 67/065
USPC ........ 700/253, 250; 901/31, 39; 318/568.21; 414/1, 7
See application file for complete search history.

(56) References Cited

U.S. PATENT DOCUMENTS

| | | | |
|---|---|---|---|
| 5,541,485 A * | 7/1996 | Teichmann | B25J 9/1612 318/568.21 |
| 5,762,390 A | 6/1998 | Gosselin et al. | |
| 8,240,729 B2 * | 8/2012 | Vittor | B25J 15/02 294/213 |
| 9,067,324 B2 * | 6/2015 | Matsuoka | B25J 15/0023 |
| 9,126,342 B2 | 9/2015 | Birglen | |
| 9,314,932 B2 * | 4/2016 | Ciocarlie | B25J 15/08 |
| 9,505,135 B1 * | 11/2016 | Malstrom | B25J 15/12 |
| 2005/0218679 A1 * | 10/2005 | Yokoyama | B25J 15/10 294/99.1 |
| 2011/0010009 A1 * | 1/2011 | Saito | B25J 9/1612 700/253 |

(Continued)

OTHER PUBLICATIONS

Higashimori, Mitsuru et al., "Design of the 100G Capturing Robot Based on Dynamic Preshaping," The International Journal of Robotics Research, vol. 24, No. 9, Sep. 2005, pp. 743-753, Sage Publications, Retrieved from the Internet Feb. 22, 2016 <http://ijr.sagepub.com/content/24/9/743.abstract?.

(Continued)

*Primary Examiner* — Bao Long T Nguyen
(74) *Attorney, Agent, or Firm* — McDonnell Boehnen Hulbert & Berghoff LLP

(57) ABSTRACT

A robotic gripping device with a preshaper is provided. The robotic gripping device includes two opposable fingers, each finger having a deformable gripping surface, a base, and a fingertip. The robotic gripping device also includes an actuator coupled to the base of each of the fingers, wherein the actuator is configured to move the fingers toward and away from each other. The robotic gripping device also includes a preshaper component positionable between the fingers, wherein when the fingers are moved toward each other by the actuator and the deformable gripping surface of each finger contacts the preshaper component, the deformable gripping surface of each finger is deformed by the preshaper component such that the fingertips of each finger are curled inward toward each other.

17 Claims, 16 Drawing Sheets

(56) References Cited

U.S. PATENT DOCUMENTS

| | | | | |
|---|---|---|---|---|
| 2012/0175904 | A1* | 7/2012 | Murakami | B25J 15/10 294/213 |
| 2013/0106127 | A1* | 5/2013 | Lipson | B25J 15/0023 294/189 |
| 2013/0154294 | A1* | 6/2013 | Shiomi | B25J 11/0045 294/213 |
| 2013/0184870 | A1* | 7/2013 | Ota | B25J 9/1669 700/262 |
| 2014/0035306 | A1* | 2/2014 | Garcia | B25J 15/0009 294/213 |
| 2014/0097631 | A1* | 4/2014 | Ciocarlie | B25J 15/08 294/198 |
| 2014/0306473 | A1* | 10/2014 | Koehler | F03G 7/065 294/192 |
| 2015/0028613 | A1* | 1/2015 | Nakayama | B25J 15/12 294/196 |
| 2016/0052149 | A1* | 2/2016 | Ekas | B25J 15/0009 294/106 |

OTHER PUBLICATIONS

Lael U. Odhner, et al, The International Journal of Robotics Research, A Compliant, underactuated hand for robust manipulation, The International Journal of Robotics Research 2014 33: 736 orginially published online Feb. 17, 2014 DOI: 10.1177/0278364913614466.

Lael U. Odhner et al, Exploring Dexterous Manipulation Workspaces with the iHY Hand, JRSJ vol. 32 No. 4, May 2014.

Lael U. Odhner, et al, Precision Grasping and Manipulation of Small Objects from Flat Surfaces using Underactuated Fingers, 2012 IEEE International Conference on Robotics and Automation RiverCentre, Saint Paul, Minnesota, USA, May 14-18, 2012.

* cited by examiner

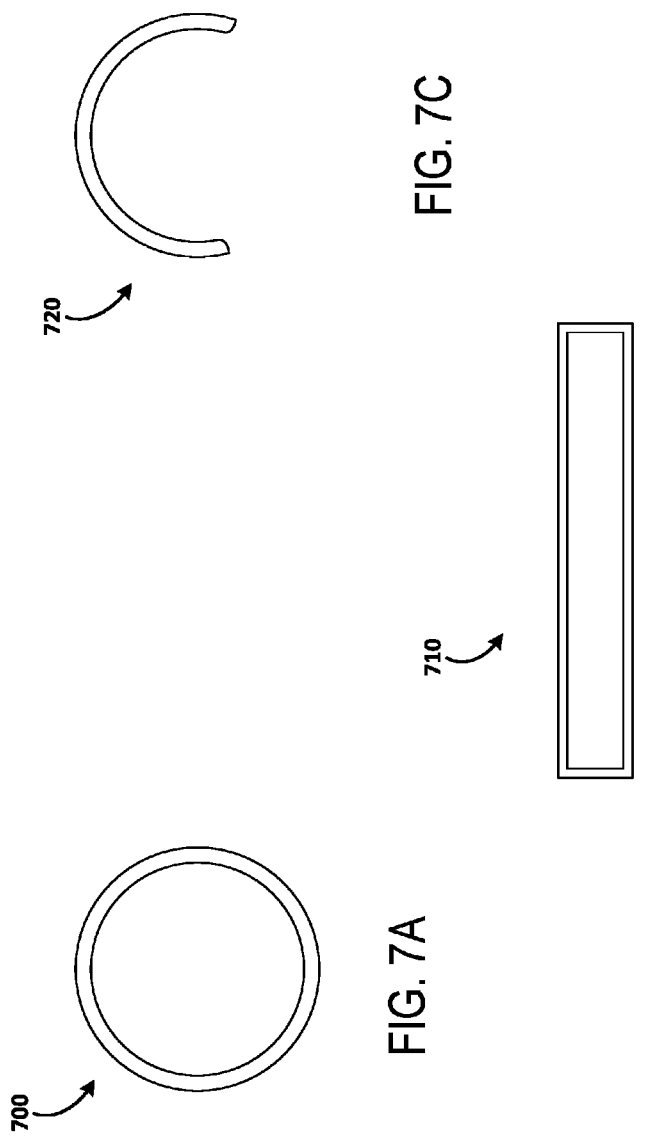

ND FINGERS

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Robotic devices, such as robotic legs and arms, may include various components or attachments that are designed to interact with the environment. Such components may include robotic feet and hands, which may include additional components that can be used to support, stabilize, grip, and otherwise allow a robotic device to effectively carry out one or more actions.

In particular, robotic arms may include one or more "end effectors" that interact with the environment. For example, end effectors may be impactive (such as a claw), ingressive (such as a pin or needle), astrictive (such as a vacuum or suction element) or contigutive (requiring contact for adhesion, such as glue).

SUMMARY

The present application discloses implementations that relate to preshaping a robotic gripping device. A robotic gripping device may include two fingers, arranged opposite each other, that may be actuated to grasp an object. In some embodiments, it may be beneficial to preshape the fingers in order to grasp small or flat objects, for example. To accomplish this, a preshaper component may be used. The preshaper component can be placed between the fingers, such that when the fingers are actuated to close on an object, the shape of the fingers are altered. The fingertips may curl inward toward each other, allowing the robotic gripping device to grasp small and/or flat objects more easily.

In one example, the present application describes a robotic gripping device. The robotic gripping device includes two opposable fingers, each finger having a deformable gripping surface, a base, and a fingertip. The robotic gripping device also includes an actuator coupled to the base of each of the fingers, wherein the actuator is configured to move the fingers toward and away from each other. The robotic gripping device yet further includes a preshaper component positionable between the fingers, wherein when the fingers are moved toward each other by the actuator and the deformable gripping surface of each finger contacts the preshaper component, the deformable gripping surface of each finger is deformed by the preshaper component such that the fingertips of each finger are curled inward toward each other.

In another example, a method is described. The method involves identifying an object for a robotic gripping device to grasp, wherein the robotic gripping device comprises one or more fingers each having a deformable gripping surface, a base, and a fingertip. The method also involves determining, based on one or more characteristics of the identified object, to position a preshaper component proximate to the one or more fingers of the robotic gripping device before grasping the identified object. The method further involves positioning the preshaper component proximate to the one or more fingers. The method yet further involves actuating the one or more fingers to move toward the preshaper component such that the deformable gripping surface of each of the one or more fingers contacts the preshaper component and the fingertip of each of the one or more fingers curls around the preshaper component. The method still further involves further actuating the one or more fingers to cause the one or more fingers to grasp the identified object.

In a third example, a robotic device is described. The robotic device includes an end effector, wherein the end effector comprises (i) two fingers each having a deformable gripping surface, a base, and a fingertip, and (ii) an actuator coupled to the base of each finger. The robotic device also includes one or more preshaper components. The robotic device yet further includes a control system configured to control the robotic device, wherein the control system includes one or more processors. The control system also includes a non-transitory computer-readable memory. The control system further includes program instructions stored on the non-transitory computer-readable memory, and executable by the one or more processors to carry out one or more actions. The actions include identifying an object for the end effector to grasp. The actions also include determining, based on one or more characteristics of the identified object, to position a preshaper component between the fingers of the end effector before grasping the object. The actions further include positioning the preshaper component between the fingers. The actions still further include actuating the fingers to move toward each other such that the deformable gripping surfaces of the fingers contact the preshaper component and the fingertips curl inward toward each other. The actions also include further actuating the fingers to move toward each other, such that the fingers grasp the identified object.

In another example, a control system is described. The control system includes means for identifying an object for a robotic gripping device to grasp, wherein the robotic gripping device comprises two fingers each having a deformable gripping surface, a base, and a fingertip. The control system also includes means for determining, based on one or more characteristics of the identified object, to position a preshaper component between the fingers of the robotic gripping device before grasping the identified object. The control system further includes means for positioning the preshaper component between the fingers. The control system yet further includes means for actuating the fingers to move toward each other such that the deformable gripping surfaces of the fingers contact the preshaper component and the fingertips curl inward toward each other. The control system still further includes means for further actuating the fingers to move toward each other, such that the fingers grasp the identified object.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIGS. 7A, 7B, and 7C illustrate example preshaper component shapes, according to example implementations.

DETAILED DESCRIPTION

Figure 1:
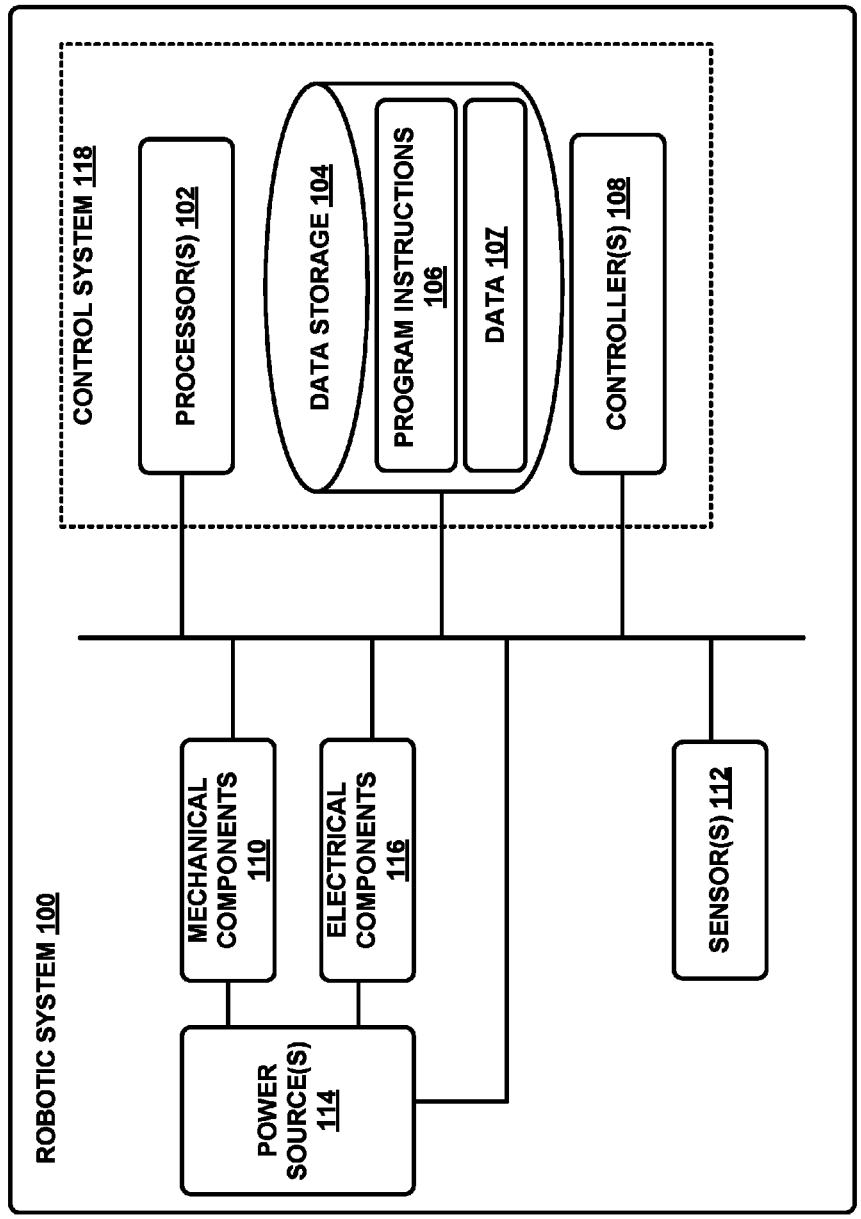
FIG. 1 illustrates a configuration of a robotic system, according to an example implementation.

The following detailed description describes various features and functions of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, the implementations and embodiments described herein are not meant to be limiting. It will be readily understood that certain aspects of the disclosed devices, systems, and methods can be arranged and combined in a wide variety of different configurations, all of which are contemplated herein. Additionally, the following detailed description describes various features and functions of the disclosure with reference to the accompanying Figures. In the Figures, similar symbols typically identify similar components, unless context dictates otherwise.

I. Overview

As noted above, robotic arms may include many different types of end effectors. One often used type of end effector is a gripper, which allows a robotic arm to grip or grasp an object. Many grippers include two or more fingers that act to grasp an object in a pincer-like manner. In some cases, these grippers may include underactuated fingers. Underactuated fingers include the benefit of less complexity, and easier control, because each phalanx of the finger is not independently actuated. Instead, the full finger is actuated together. As a result, however, underactuated fingers have fewer degrees of freedom and cannot easily change their shape to accomplish tasks requiring a differently shaped finger. For instance, grippers that include underactuated fingers can have difficulty grasping flat objects, such as a credit card or business card placed flat on a table. In addition, these grippers can have difficulty gripping a handle, or creating a closed loop between the fingers (i.e. an "O" shape) which may be beneficial for gripping certain objects.

Preshaping the fingers of a robotic gripper can increase the versatility and number of uses for a robotic gripper having underactuated fingers. Preshaping can provide the ability for a gripper to pick up small or flat objects, or to grasp a handle, among many other uses.

Example embodiments of a robotic gripping device described herein may include two opposable fingers, each finger having a deformable gripping surface, a base, and a fingertip. The two opposable fingers may be facing each other, and may be arranged such that a pincer-like action can be performed. The deformable gripping surfaces of the fingers may run the length of each finger between the base and the fingertip, and may face inward toward each other such that an object positioned between the fingers can make contact with both deformable gripping surfaces.

The robotic gripping device may also include an actuator coupled to the base of each of the fingers. The actuator may be configured to move the fingers toward and away from each other in a pincer-like manner, such that the fingers rotate about respective axes. Put another way, the actuator may be configured to move the fingers such that an angle created by the fingers increases and/or decreases.

The robotic gripping device may also include a preshaper component positionable between the fingers. In some examples the preshaper component may be a cylinder or rectangular block. When the fingers are moved toward each other by the actuator and the deformable gripping surface of each finger contacts the preshaper component, the deformable gripping surface of each finger may be deformed by the preshaper component such that the fingertips of each finger are curled inward toward each other. As an example, a robotic gripping device without a preshaper component positioned between the fingers may close by actuating the fingers, and the fingers may close such that the deformable gripping surfaces are straight and generally parallel or flush with each other. Alternatively, where the preshaper component is positioned between the fingers, the fingers may be closed and upon contact between the deformable gripping surfaces and the preshaper component the deformable gripping surfaces may curve or bend inward. As a result, the fingertip sections may be angled toward each other.

In some examples, the size and position of the preshaper component between the fingers of the robotic gripping device may determine the extent to which the fingers curl inward. For instance, when the preshaper is positioned at a first position near the base of the fingers, actuating the fingers may cause the fingers to curl inward more than if the preshaper is positioned at a second position near the fingertips. Further, a wider or larger preshaper component may cause the fingers to curl inward by a greater amount than a smaller or narrower preshaper component, given the same amount of actuation of the fingers.

II. Example Robotic Systems

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a robotic arm, industrial robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), wheel(s), hand(s), finger(s), feet, preshaper components, and/or end effectors. The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment. In another example, sensor(s) 112 may capture data corresponding to one or more characteristics of a target or identified object, such as a size, shape, profile, structure, or orientation of the object.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such as the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm, leg, hand, foot, or finger to measure the load on the actuators that move one or more members of the arm, leg, hand, foot, or finger. As another example, the robotic system 100 may use one or more position sensors to sense the position of the actuators of the robotic system. For instance, such position sensors may sense states of extension, retraction, positioning, or rotation of the actuators on arms, legs, hands, feet, fingers, preshaper components, or end effectors.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, end effectors, gripping devices and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, robotic arm implementations of the robotic system 100 are described below.

Figure 2:
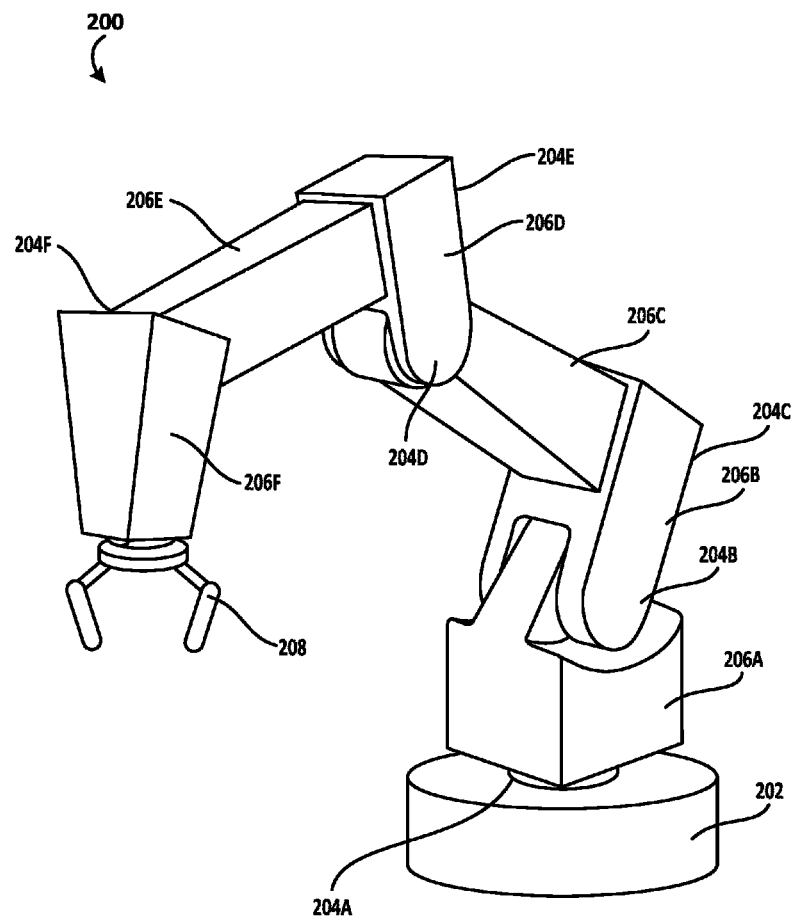
FIG. 2 illustrates an example robotic arm, according to an example implementation.

FIG. 2 shows an example robotic arm 200. As shown, the robotic arm 200 includes a base 202, which may be a stationary base or may be a movable base. In the case of a movable base, the base 202 may be considered as one of the mechanical components 110 and may include wheels (not shown), powered by one or more of actuators, which allow for mobility of the entire robotic arm 200.

Additionally, the robotic arm 200 includes joints 204A-204F each coupled to one or more actuators. The actuators in joints 204A-204F may operate to cause movement of various mechanical components 110 such as appendages 206A-206F and/or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the mechanical components 110, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

Figure 3:
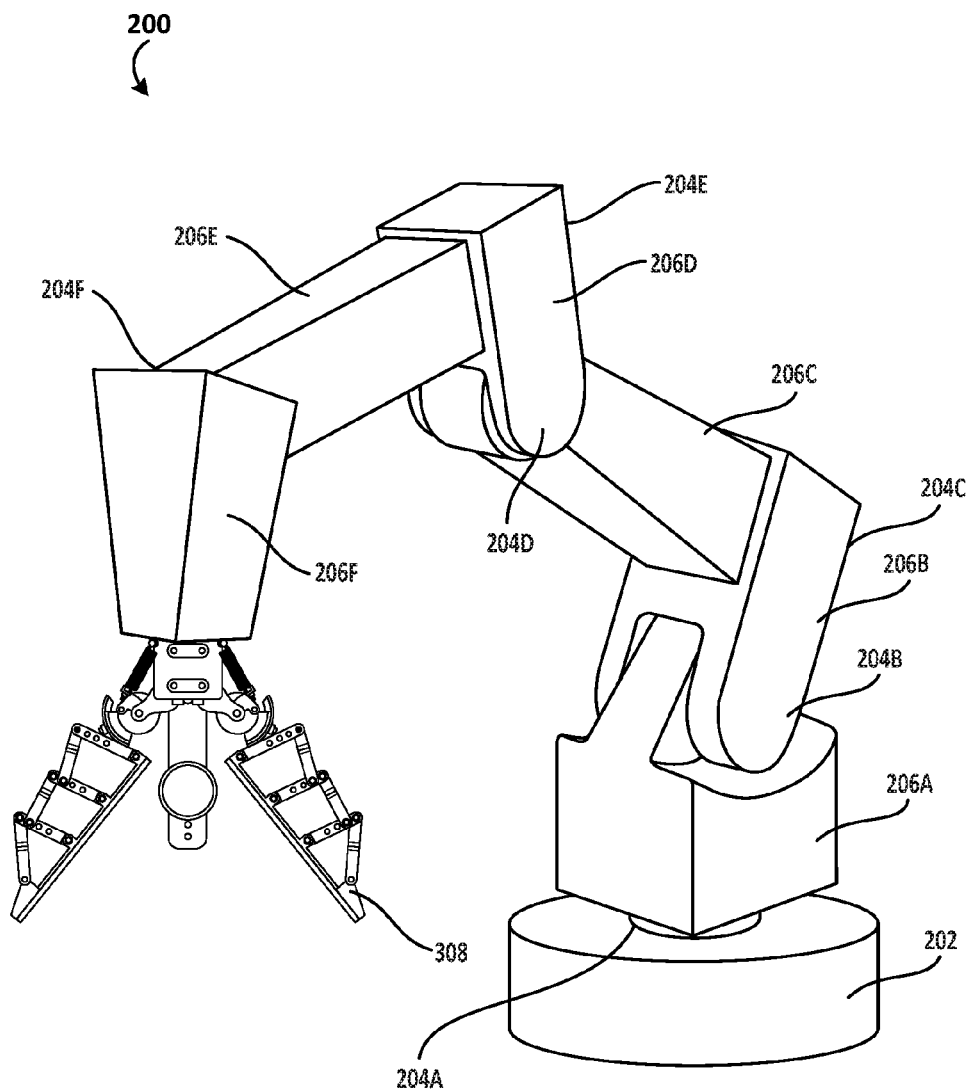
FIG. 3 illustrates the example robotic arm of FIG. 2 having a gripper with a preshaper component, according to an example implementation.

FIG. 3 shows the example robotic arm 200 with a robotic gripping device 308. Robotic gripping device 308 may be similar or identical to robotic gripping devices 400, 500, 800, 1000, and 1100 described in more detail below.

III. Example Robotic Gripping Device

Figure 4A:
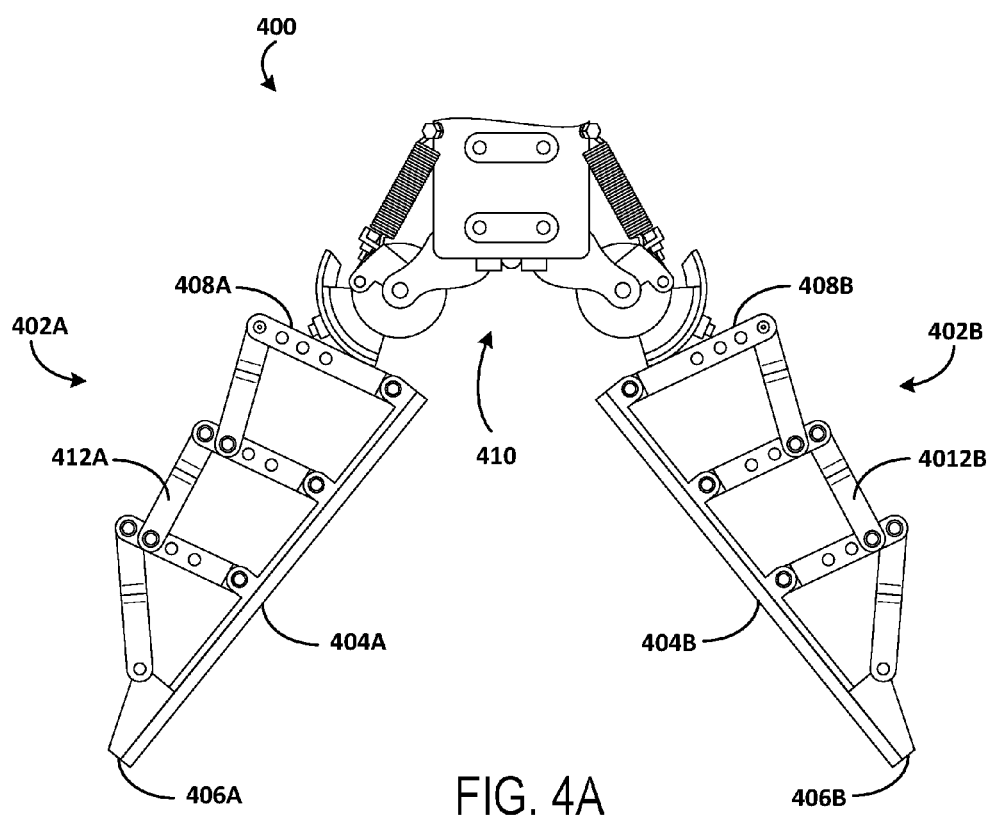
FIG. 4A illustrates an example robotic gripping device in an open position, according to an example implementation.

As noted above, the present disclosure includes implementations that relate to robotic gripping devices and/or end effectors. FIG. 4A illustrates an example robotic gripping device 400 according to an example implementation. Robotic gripping device 400 may be implemented as a mechanical component of system 100 and/or robotic arm 200. Although the components illustrated in FIG. 4 are shown with a certain orientation and/or design, it should be understood that one or more components of robotic gripping device 400 may be removed, added, and/or modified while remaining within the scope of this disclosure. Also, the orientation and combination of components may be changed based on the desired implementation.

Robotic gripping device 400 may include one or more physical components, including one or more fingers 402A-B, actuators 410, and/or preshaper components. In some examples, robotic gripping device 400 may include two opposable fingers, as shown in FIG. 4. In other examples, more or fewer fingers may be included. For instance, where three or more fingers are included, the fingers may be arranged in two groups opposing each other, such that when they are actuated they close toward each other. Two fingers may be positioned opposite the third, such that when the fingers close they interlock.

Each finger 402A-B may include a deformable gripping surface 404A-B, a fingertip 406A-B, and a base 408A-B. The fingers 402A-B may also each include an outward facing member 412A-B. Further, an example finger may include a fingernail or tapered section at the end of the fingertip. The fingernail may be a flat section that may be configured for gripping or sliding under an object.

Figure 4B:
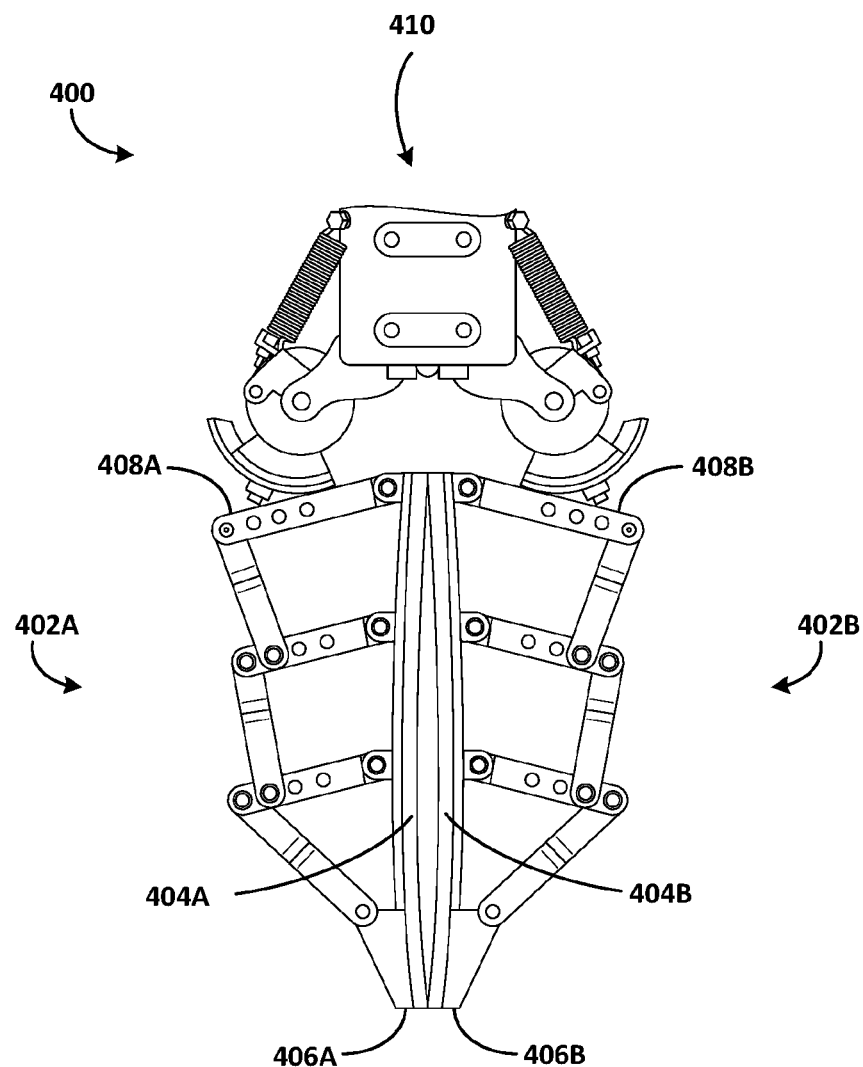
FIG. 4B illustrates the example robotic gripping device of FIG. 4A in a closed position, according to an example implementation.

Deformable gripping surface 404A-B may be a flexible plastic, rubber, or other material suitable for gripping an object. In some examples, deformable gripping surface 404A-B may be a single or unitary component, such as is shown in FIGS. 4A-B. In other examples, deformable gripping surface 404A-B may include a plurality of members coupled together end-to-end to create an elongated gripping surface. The plurality of members may be rotatably coupled together by joints, such as pin joints, rolling joints, or circular joints, for example. Further, deformable gripping surface 404A-B may be configured to be generally straight under normal circumstances, such as when no pressure or force is applied to the surface and the finger is in a normal operating state. In other examples, deformable gripping surface 404A-B may be configured to have a bend or curve under normal circumstances (i.e., a biased shape), such that when no pressure or force is applied to the gripping surface it is curved or bent nonetheless.

In some examples, deformable gripping surface 404A-B-may run the entire length of the finger between the fingertip 406A-B and the base 408A-B of the finger 402A-B. In other examples, deformable gripping surface 404A-B may be included on only a portion of an inner surface of the finger, such that only a portion of the finger includes the deformable gripping surface.

Deformable gripping surface 404A-B may deform, bend, curve, distort, warp, stretch, or otherwise alter its shape based on one or more factors, such as an impacting force of pressure. In an example embodiment, a preshaper component (described in further detail below) may exert a pressure or force on the surface of deformable gripping surface 404A-B. Deformable gripping surface 404A-B may responsively deform such that it follows the contour of the preshaper component. For instance, where the preshaper is a cylinder, deformable gripping surface 404A-B may bend to follow the cylinder where it contacts the gripping surface, thereby evenly distributing the force of the preshaper component along the gripping surface making contact. In other examples, the preshaper component may be a rectangular block, asymmetric shape, or other shaped component, and may cause deformable gripping surface 404A-B to deform based on the part of the preshaper component that contacts deformable gripping surface 404A-B, as well as the kinematics of the fingers 402A-B themselves.

Each finger 402A-B may also include a base 408A-B. Base 408A-B may be a proximate end of the finger, and may be used to couple the finger to one or more actuators that move the finger. Further, each finger 402A-B may also include a fingertip 406A-B. Fingertips 406A-B may be included at the distal end of the finger 402A, and may be configured for gripping, grasping, pinching, or grabbing an object.

In some examples, each finger 402A-B may also include an outward facing member 412A-B. Outward facing member 412A-B may be coupled to deformable gripping surface 404A-B and fingertip 406A-B to form finger 402A-B. Each outward facing member 412A-B may include a plurality of members coupled together by joints to create a generally rigid finger structure. The plurality of members may be coupled together by joints, such as pin joints, rolling joints, or circular joints, for example, which may allow the structure to bend when a force is applied, yet return to a normal state when the force is removed. In some examples, the structure and material of the deformable gripping surfaces may cause the structure to return to the normal state when the force is removed. The structure of each outward facing member 412A-B may be such that the structure will bend or deform, but only in one direction. Further, outward facing member 412A-B may be configured such that when a pressure or force is applied to deformable gripping surface 404A-B such that it deforms, outward facing member 412A-B may deform in a similar manner, and/or may cause the fingertips of the fingers to curl inward toward each other.

In some examples, fingers 402A-B may be underactuated fingers. Fingers 402A-B may have a structure such that each phalanx is not actuated independently, but the full finger is actuated at the same time, and/or actuated by a single actuator or movement. A phalanx is a section of a finger. As an example, a typical human index finger includes three phalanxes.

Robotic gripping device 400 may also include an actuator 410. Actuator 410 may be configured to move the fingers toward and away from each other. In some examples, the fingers may each rotate about a fixed point, such that the actuator moves the fingers from an open state (FIG. 4A) to a closed state (FIG. 4B). Actuator 410 may be configured to move the fingers by set amounts, such that an angle is created by the fingers, which can be measured in degrees, or radians, for example. For instance, the fingers shown in FIG. 4A may be described as having an angle between them of 80 degrees (i.e., open), while the fingers shown in FIG. 4B may be described as having an angle between them of 0 degrees (i.e., closed).

In some examples, robotic gripping device 400 may include a single actuator 410 which actuates both fingers 402A-B of the device. In other examples, each finger 402A-B may have a separate respective actuator, such that each finger may be actuated or moved independently.

Figure 5A:
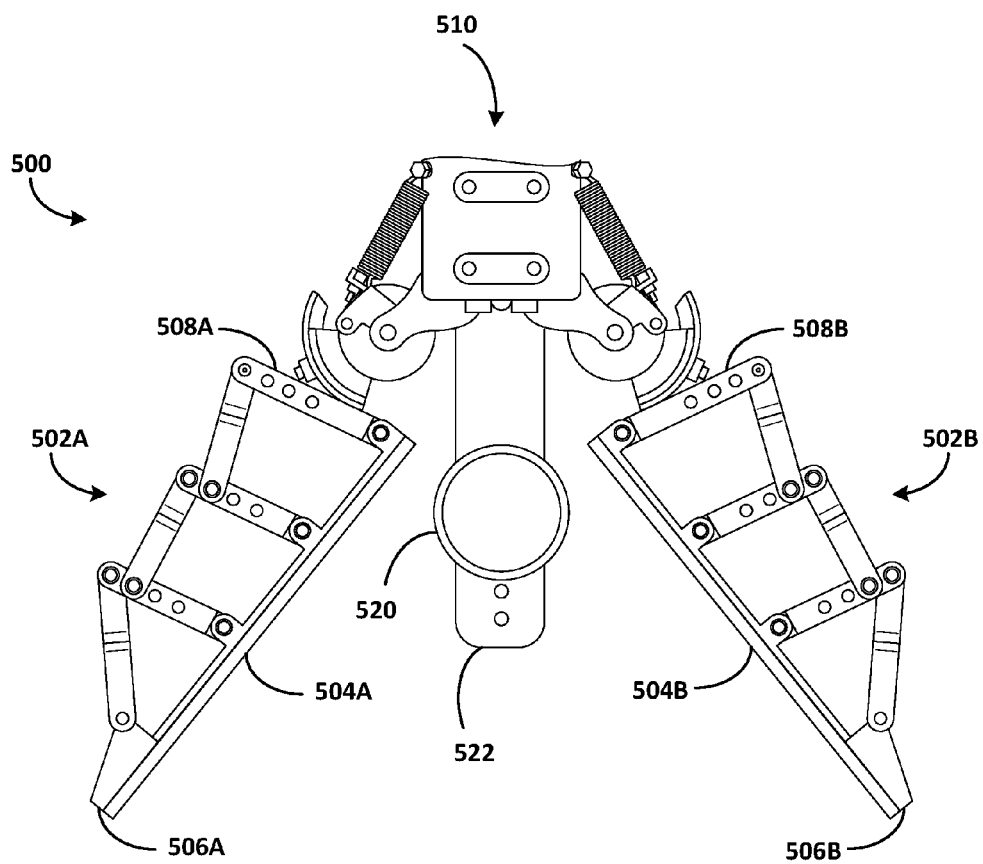
FIG. 5A illustrates an example robotic gripping device in an open position with a first type of preshaper component, according to an example implementation.

FIG. 5A illustrates an example robotic gripping device 500 in an open position with a first type of preshaper component 520, according to an example implementation. A second type of preshaper component is described below with reference to FIGS. 10A-10B and 11A-11B. Within examples, a preshaper component is a tangible, shaped piece that imparts a force on the fingers of a gripping device when the fingers are actuated to close, wherein the force is based on the particular shape of the component. Robotic gripping device 500 may be similar or identical to robotic gripping device 400 in one or more respects. FIG. 5A illustrates a top view of the robotic gripping device and a cylindrical preshaper component 520. Robotic gripping device 500 may include a preshaper component 520, and an elongated member 522. Elongated member 522 may be coupled to actuator 510, and/or one or more other components of the robotic gripping device 500 such as a palm section or arm section (not shown).

Preshaper component 520 may be positioned between the fingers 502A-B as shown in FIG. 5A. When actuator 510 moves the fingers toward each other, the deformable gripping surface 504A-B of each finger may contact preshaper component 520, and the deformable gripping surface 504A-B may be deformed by the preshaper component such that the fingertips of each finger are curled inward toward each other.

Figure 5B:
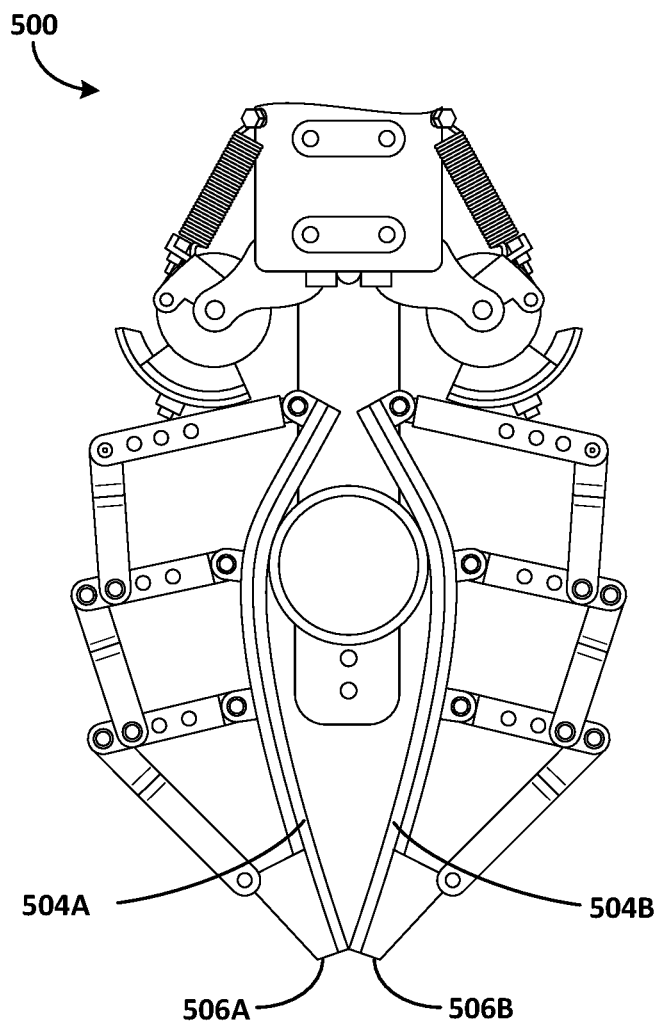
FIG. 5B illustrates the example robotic gripping device of FIG. 5A in a closed position, according to an example implementation.

In one example, actuator 510 may move the fingers such that the deformable gripping surfaces 504A-B contact preshaper component 520. Responsive to making contact, deformable gripping surfaces 504A-B may start to deform. Then, when actuator 510 further moves the fingers toward each other, the deformable gripping surfaces 504A-B may further deform, based on the shape of preshaper component 520. FIG. 4B illustrates a closed robotic gripping device, in which the fingertips 406A-B of the fingers are generally flat against each other. FIG. 5B, on the other hand, illustrates a closed robotic gripping device having a preshaper component, in which the deformation of the deformable gripping surfaces 504A-B has caused the fingertips 506A-B to contact each other at an angle. The deformation caused by the preshaper component contacting the deformable gripping surfaces has caused the fingertips to approach each other at a steeper angle, and can allow the robotic gripper to pick up or grasp objects that are flatter, smaller, and/or not able to be picked up by the gripping device shown in FIGS. 4A-4B.

In some examples, the fingers may also include fingernails or tapered sections at the end of or instead of the fingertips. The deformation caused by the preshaper component contacting the deformable gripping surfaces may cause the fingernails to approach each other at a steeper angle than when un-deformed, such that the fingernails can slide under an object or approach the object with a more pointed surface. The steeper angle may allow the fingertips and/or fingernails to be flatter against a surface on which the object rests, facilitating the gripping of flat objects.

Figure 6C:
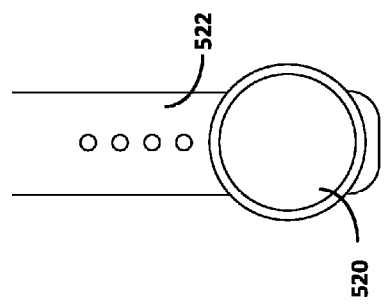
FIGS. 6A, 6B, and 6C illustrate example placement of a preshaper component along an axis between the fingers of an example robotic gripping device, according to example implementations.
Figure 6B:
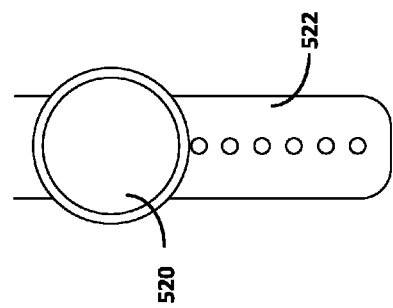
Figure 6A:
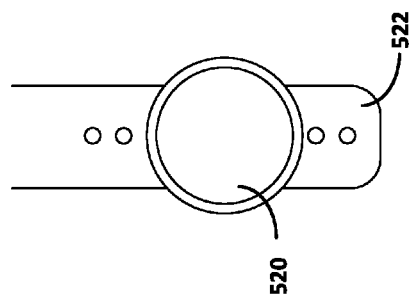

As shown in FIGS. 5A and 5B, preshaper component 520 may be positioned between the fingers of the robotic gripping device. In some examples, the preshaper component may be positionable between the fingers on an axis that bisects an angle between the fingers. For instance, FIGS. 6A-C illustrate examples positions for preshaper component 520. In some examples, an actuator may move preshaper component 520 from a first position to a second position on elongated member 522. Alternatively, an actuator may move elongated member 522 from a first position to a second position, while preshaper component 520 remains in the same position on elongated member 522.

FIG. 6A illustrates a positioning of preshaper component 520 in the middle of the fingers, generally half way between the base and the fingertip of the fingers. FIG. 6B illustrates an example in which preshaper component 520 is positioned near the base of the fingers. And FIG. 6C illustrates an example in which preshaper component 520 is positioned near the fingertips of the fingers.

In some examples, when the preshaper component is positioned on the axis at a first position (e.g., FIG. 6B) and the fingers are closed to a first angle, the deformable gripping surface of each finger may be deformed by a first amount. Then, when the preshaper component is positioned on the axis at a second position that is farther from the base of the fingers than the first position (e.g., FIG. 6C), and the fingers are closed to the first angle, the deformable gripping surface of each finger is deformed by a second amount that is less than the first amount. As such, positioning the preshaper component 520 nearer to the base of the fingers may cause the fingertips of the fingers to curl inward, and have a steeper or sharper angle when the fingers are actuated.

In other examples, preshaper component 520 may be positioned between the fingers on an axis perpendicular to the axis bisecting the fingers. For instance, the preshaper component may be positioned between the fingers, closer to one finger than the other. In this way, preshaper component 520, shown in FIGS. 6A, 6B, and 6C may act differently or asymmetrically upon the fingers. In such a case where the preshaper component is positioned closer to a first finger than a second finger, the first finger may curl inward by a greater amount than the second finger when both fingers are actuated by the same amount.

As shown in FIGS. 5A and 5B, preshaper component 520 may be a physical component, and may be made out of plastic, metal, or any other material suitable for applying pressure to one or more fingers of a gripping device. In some examples, preshaper component 520 may be a cylinder. In other examples, other shapes may be used as well. For instance, FIGS. 7A-C illustrate a cylinder, rectangular block, and "U-shape" preshaper components respectively. Cylindrical preshaper component 700 may be beneficial by allowing the force on the deformable gripping surfaces to be distributed evenly across the portion of the surface that contacts the preshaper component. On the other hand, rectangular block preshaper component 710 may be beneficial by putting a greater force on a smaller area of the deformable gripping surfaces. As a result, the fingers may curl inward to a greater extent, or may have a different deformed shaped than the fingers that are deformed by cylindrical preshaper component 700. Further, "U-shaped" preshaper component 720 may be beneficial by providing all the functions of preshaper components described herein, while not interfering with or taking up as much space between the fingers in which an object to be grabbed may be located. The "U-shaped" preshaper may be oriented between the fingers such that the open end of the "U" faces away from the actuator and/or bases of the fingers, and mirrors a "V" shape created by the fingers. In this orientation, the object to be grabbed may protrude further into the grasp of the robotic device (and may even protrude into the cavity of the "U-shaped" preshaper) without contacting the preshaper component. This may provide an added benefit as compared to a gripping device having a cylindrical or other shape of preshaper component.

In some examples, different sizes of preshaper components are possible as well. For instance, a wider rectangular block may be used to cause the fingers to curl inward more. In addition, a wider rectangular block may be used to match the width of an object. Similarly, a narrower rectangular block may be used to cause the fingers to curl inward less, and/or match the width of an object.

In other examples, an asymmetric preshaper component may be used. For instance, a crescent shape, "D-shape," or any other asymmetric shape may be used. Where an asymmetric preshaper component may be used to allow one finger to deform by a different amount or based on a different shape than the second finger. For instance, the surface of the asymmetric preshaper component that contacts the deformable surface of a first finger is a different shape than the surface of the preshaper component that contacts the deformable surface of a second finger. As a result, the first finger may deform by a different amount or to a different extent than the second finger.

In some examples, an asymmetric preshaper may allow a robotic gripping device to uncap a valve, such as a tire valve, or to perform a "rolling" function like a person may use with his or her fingers. One finger of the robotic gripping device may grip the valve and remain stationary, while the other finger may be actuated, contact the asymmetric preshaper, and curl inward in a manner that "rolls" the cap. Another example use may be to "hook" an object with one finger, or to create an asymmetric gripper having one finger bent in a first shape and the other finger bent in a second shape.

A further example may use an asymmetric preshaper to carry out a "pin and pry" action. The "pin and pry" action may include a first finger that stays straight and pins an object down to a surface, while a second finger curls in to pry under the object. This action may be similar to the way a person may pick up a poker chip or other flat object from the surface of a table, by pinning the object with an index finger and using a thumb to pry under the object. Other uses are possible as well.

Figure 8:
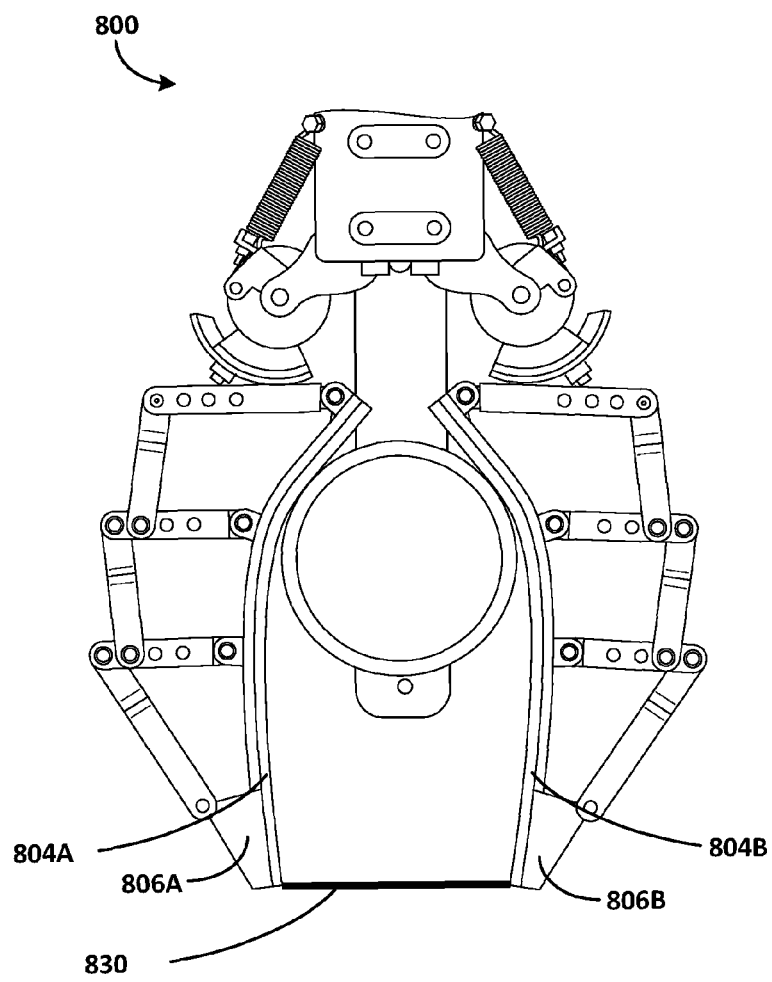
FIG. 8 Illustrates an example robotic gripping device grasping a flat object, according to an example implementation.

FIG. 8 illustrates an example robotic gripping device 800 grasping a flat object 830, according to an example implementation. Robotic gripping device 800 may be similar or identical to robotic gripping device 400 or 500. In FIG. 8, deformable gripping surfaces 804A-B have contacted the preshaper component, causing the fingertips 806A-B to curl inward. The fingertips then make contact with flat object 830.

As shown in FIG. 8, the surfaces of the fingertips 806A-B are at an angle that is slightly higher than 90 degrees with respect to surface on which the flat object 830 rests. As a result, the fingertips are better able to contact and grip a flat object. A robotic gripping device without a preshaper component, such as robotic gripping device 400, may have fingertips for which the surface does not reach an angle greater than 90 degrees. As a result, robotic gripping device 400 may have an ejecting grasp, in which objects that make contact with the fingertips are pushed away from the gripper. Alternatively, robotic gripping devices such as robotic gripping device 500 or 800 may have an injecting grasp, in which an object may be pushed into the grasp of the gripper. This may result in a better and more useful gripping device.

IV. Example Operations

Figure 9:
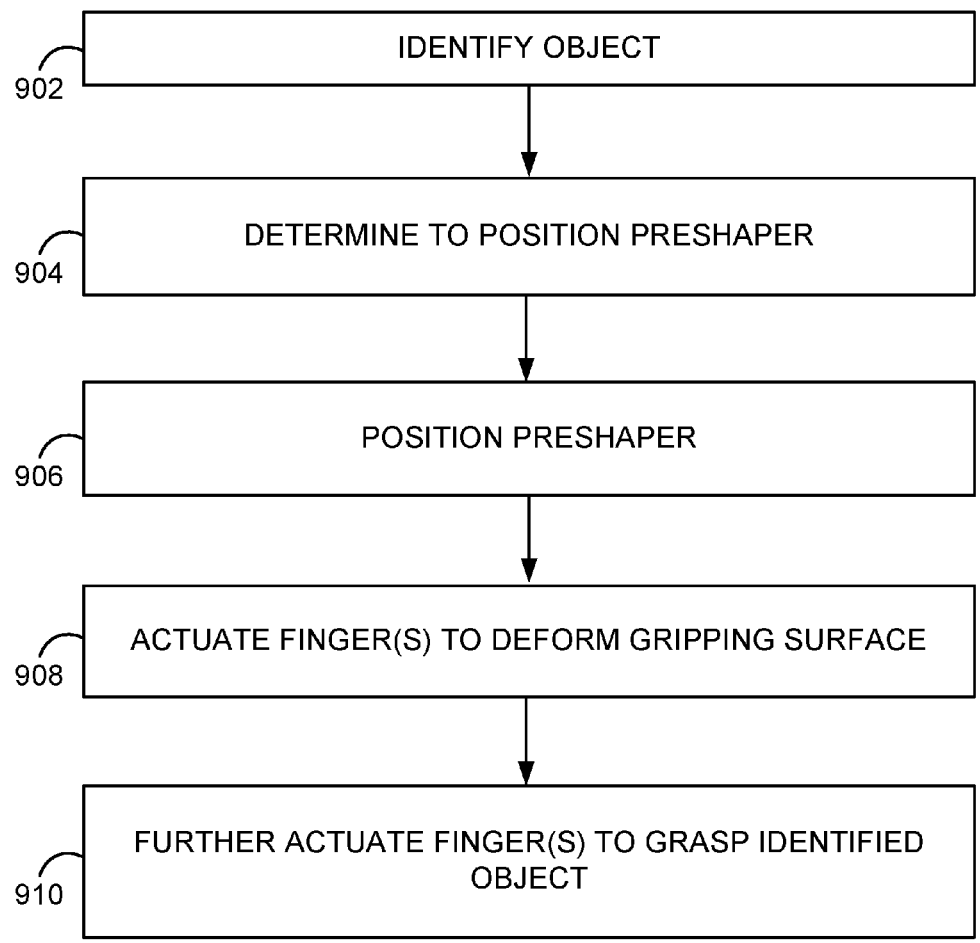
FIG. 9 illustrates an example method of operating a robotic gripping device of the present disclosure, according to an example implementation.

FIG. 9 illustrates a flowchart of an example method 900 of operating a robotic gripping device of the present disclosure. This example applies to a robotic gripping device such as robotic gripping device 400, 500, and/or 800, but may be applied to other robotic gripping devices having different arrangements of fingers or other components, and/or different types of components. Further, method 900 may be carried out by one or more control systems of the robotic system 100 and/or robotic arm 200.

At block 902, method 900 may include identifying an object for a robotic gripping device to grasp, grip, pinch, grab, or hold. In some examples, identifying the object may include determining an object based on its shape, orientation, profile, size, or another characteristic. In other examples, the object may be identified by a remote operator and/or computing system coupled to the robotic gripping device. The determination may be made based on received sensor data from one or more sensors, such as a visual sensor, touch sensor, pressure sensor, or other sensor, for example.

In some examples, an object such as a pole or handle may be identified. In this case, it may be beneficial to preshape the fingers of a gripping device in order to curl around the pole or handle such that the fingertips connect, creating a circular grip around the pole. A further example of this implementation may be to pluck a fruit off a vine, such that the fingertips connect around the fruit, and pluck the stem without putting pressure on or squeezing the fruit itself. Other uses are possible as well.

At block 904, method 900 may include determining to position a preshaper component proximate to one or more fingers of the robotic gripping device. In some examples, this determination may be based on one or more characteristics of the identified object. For instance, where the identified object is a small object, an object that is flat against a surface, or an object which must be gripped delicately (e.g., a grape), it may be determined that a preshaper component should be used. This determination may be made prior to grasping the identified object.

Some characteristics of the object used in this determination may include the size, shape, profile view, flatness, weight, material, plasticity, or another characteristic. In making the determination, a characteristic may refer to a single characteristic, or may refer to one or more characteristics combined together to determine to position a preshaper component. For example, multiple views of an object may be combined to determine that a preshaper component should be positioned proximate to the fingers.

In some examples, determining to position the preshaper component proximate to the fingers of the robotic gripping device may include selecting the preshaper component from a plurality of preshaper components. The plurality of preshaper components may be coupled to the robotic gripping device and may have different shapes and sizes, which when used may result in different preshaped fingers that can be used for different purposes. Some example preshaper components may include a cylinder, a rectangular shape, and a "U-shape." As one example, when a flat object is identified, a larger preshaper may be selected such that the surfaces of the fingertips are at a steeper angle with respect to each other and can grasp the flat object. Alternatively, where an asymmetrically shaped object is identified, it may be beneficial to select an asymmetric preshaper component to allow the fingers to be preshaped to grasp the object. As a further example, an asymmetric preshaper component may be selected where a "rolling" technique or a "pin and pry" action is beneficial, such as where the identified object is a valve cap or flat object on a surface. After selecting the appropriate preshaper, the selected preshaper may be positioned proximate to the fingers of the robotic gripper, which may include positioning the preshaper between two fingers of the robotic gripper.

At block 906, method 900 may include positioning the preshaper component. The preshaper component may be positioned proximate to one or more fingers of the robotic gripping device, such that the preshaper component may be positioned next to, in the path of the finger as it is actuated, or otherwise close to one or more fingers of the robotic gripping device. In one example where the robotic gripping device includes two fingers, block 906 may include positioning the preshaper component between the fingers of the robotic gripping device on an axis that bisects an angle between the fingers. For example, the axis may be a center line of the robotic gripping device. The center line may be chosen so that the deformable gripping surface of each finger contacts the preshaper component at the same time when the fingers are actuated.

In some examples, the preshaper component may be positioned at different points along the axis. For instance, as shown in FIGS. 6A-C the preshaper component may be positioned toward the base of the fingers (FIG. 6B) or toward the fingertips of the fingers (FIG. 6C). The position along this axis may be determined based on one or more characteristics of the identified object. For instance, where the identified object is a small object, it may be beneficial to position the preshaper component near to the base. Positioning the preshaper component nearer to the base may cause the fingers to deform to a greater extent, and cause the fingertips to curl inward more, which may allow the robotic gripping device to pick up the smaller object more easily.

Further, positioning the preshaper component between the fingers may include positioning the preshaper component closer to one finger than the other. This may create the effect of an asymmetric preshaper component while using a symmetric preshaper component, because actuating both fingers will cause one finger to deform differently than the other. Alternatively, positioning an asymmetric preshaper component nearer to one finger than the other may have the opposite effect, by creating the effect of a symmetric preshaper component.

In some examples, positioning the preshaper component between the fingers may include one or more movements of the gripping device. For instance, the robotic gripping device may be moved from a first position to a second position, move the selected preshaper into the determined position between the fingers, and then move back to the first position. In practice, this may involve a set of movements to engage a preshaper by moving an arm that includes the robotic gripping device, where the movement of the arm causes the preshaper component to be engaged.

In some examples, positioning the preshaper component between the fingers may include actuating the fingers to move the preshaper component into place. For instance, where the preshaper component is a preshaper component such as that shown in FIGS. 10A, 10B, 11A, and 11B (discussed in further detail below) actuating the fingers to open wider than a normal opened state may cause the preshaper component to be positioned and engaged between the fingers.

In still further examples, positioning the preshaper component may include actuating the preshaper component to change or adjust its shape. For instance, the shape of the preshaper component may be adjusted using actuation so that a single preshaper component may become multiple shapes and may be used for multiple different finger configurations and/or purposes. Changing the preshaper component shape may include rotation (e.g., rotating an elliptical preshaper to change the radius of curvature, or rotating a thin preshaper component to change the surface exposed to the fingers) flattening (e.g., flattening a cylindrical preshaper to create and ellipse), shifting (e.g., shifting a square to be an angled parallelogram), and other shape changes.

At block 908, method 900 may include actuating the fingers to deform the deformable gripping surface. As described above, actuating the one or more fingers may include rotating the fingers about a fixed point, such that the fingers move from an open state to a closed state. In some examples, block 908 may include rotating the fingers about a fixed point until the deformable gripping surface of each finger contacts the preshaper component, and begins to deform. This deformation may occur prior to the robotic gripping device contacting the identified object. Further as described above, the deformation of the deformable gripping surface may cause the fingers and/or fingertips to curl inward towards each other, or to curl around the preshaper component.

The amount of curl of the fingers may depend on the shape and size of the preshaper component, as well as how far the fingers are actuated toward each other.

At block 910, method 900 may include further actuating the fingers to grasp the identified object. In some examples, this may include gripping the sides or edges of the identified object (e.g., a credit card or business card). In other examples, block 910 may include further actuating the fingers of the robotic gripping device such that the fingertips make contact with each other. In this instance, the identified object may be a handle or pole, which is surrounded by the grip of the robotic gripping device in a pincer-like manner. The identified object may be grasped while the preshaper component is positioned between the fingers, and while the deformable gripping surfaces are deformed by the preshaper component.

In one example, the identified object may be an object such as a jug or container. In that case, the robotic gripping device may include one finger, which when actuated may curl around the lip of the jug from the inside. The finger may then grasp the jug from the inside.

A further step may include receiving sensor data indicating the shape of the actuated fingers. One or more sensors may be included on the fingers to collect information about positioning, various angles of the phalanxes of the fingers, pressures at various points on the fingers, and other data. The received sensor data may then be used to confirm a successful grasp, or to determine the best grasp position and/or preshaper component for a given object. Other uses are possible as well.

V. Example Robotic Device

An example embodiment of the present disclosure may be a robotic device including one or more components. The robotic device may include an end effector having (i) two fingers, each having a deformable gripping surface, a base, and a fingertip, and (ii) an actuator coupled to the base of each finger. The end effector may be similar or identical to robotic gripping device 400, 500, and/or 800.

The robotic device may also include one or more preshaper components. The preshaper components may be any of those described in this disclosure, such as cylindrical, rectangular, "U-shaped," symmetric, asymmetric, or any other shaped components. In some examples, the preshaper component(s) may be coupled to the robotic device. In other examples, the preshaper component may be a free standing cylinder, rectangular block, "U-shaped" block or other shape. The freestanding preshaper component may be coupled to the fingers by a force imparted by the fingers, such that the force of the fingers on the freestanding preshaper component holds the component in place between the fingers. In this way, an object in the environment of the robotic device may be used as a preshaper component.

The robotic device may also include a control system configured to control the robotic device. The control system may include one or more processors. The control system may also include a non-transitory computer-readable memory, which may have stored thereon instructions executable by the one or more processors. The instructions may include (i) identifying an object for the end effector to grasp, (ii) determining, based on one or more characteristics of the identified object, to position a preshaper component between the fingers of the end effector before grasping the object, (iii) positioning the preshaper component between the fingers, (iv) actuating the fingers to move toward each other such that the deformable gripping surfaces of the fingers contact the preshaper component and the fingertips curl inward toward each other, and (v) further actuating the fingers to move toward each other, such that the fingers grasp the identified object.

In some examples, the robotic device carrying out the instructions may be similar or identical to performing the method 900. For example, identifying the object for the end effector to grasp may be similar to the step of block 902 described with reference to a robotic gripping device. Further, determining to position the preshaper component between the fingers of the end effector may be similar or identical to the step of block 904. The instructions described above may also mirror the steps of blocks 906, 908, and 910.

In one example, the control system of the robotic device may further be configured to (i) determine a height of the identified object above a surface on which the identified object is resting, (ii) determine that the height of the identified object is below a threshold height, and (iii) determine to position the preshaper component between the fingers of the end effector before grasping the object in response to determining that the height of the identified object is below the threshold height. Determining the height of the identified object above a surface on which the identified object is resting may include receiving data from one or more sensors, such as an image sensor. The object may be resting flat on a surface such as a table or desk. Alternatively, the object may be resting against a wall, and the measured height may be a distance the object protrudes from the surface of the wall. Further, the threshold may be as small as a millimeter or a few millimeters, or may be larger such as a centimeter or several centimeters. Even larger thresholds are possible as well. In some examples, the threshold may be determined based on the size and/or shape of the fingers, fingertips, or other components of the robotic device, such that a small fingertip may result in a smaller threshold.

VI. Example Variations a. Alternative Preshaper Component

Figure 10A:
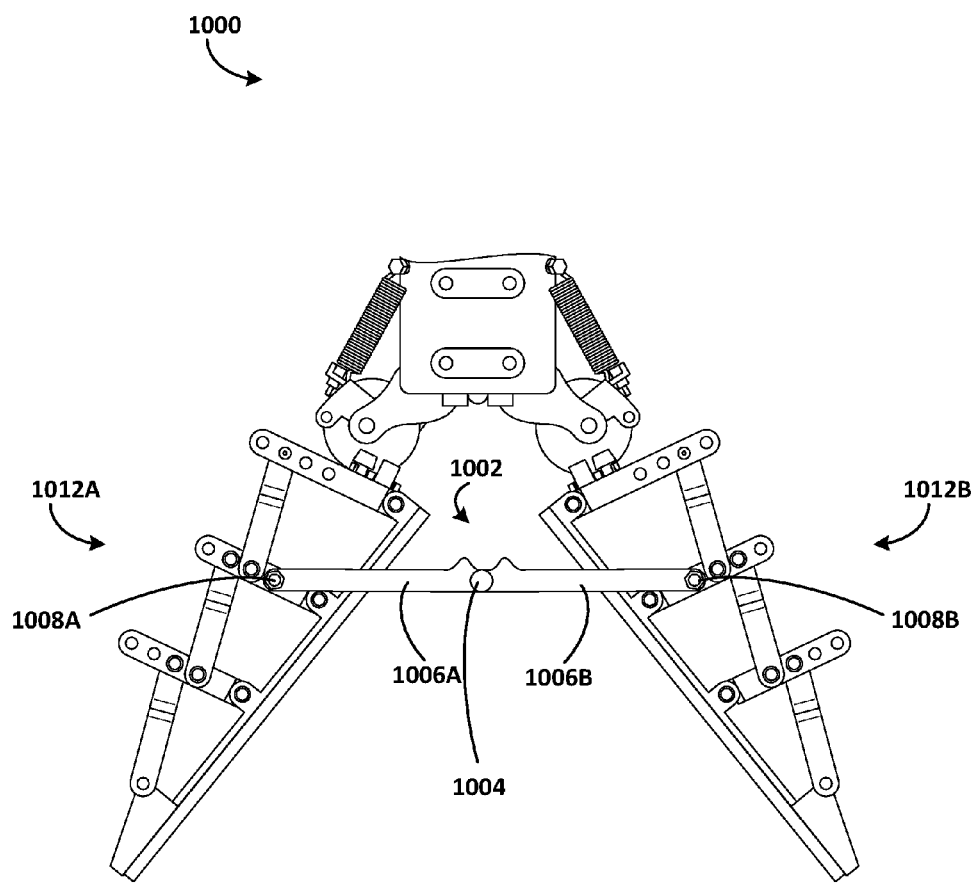
FIG. 10A illustrates an example robotic gripping device in an open position with a second type of preshaper component in an unengaged state, according to an example implementation.

FIG. 10A illustrates an example robotic gripping device 1000 in an open position with a second type of preshaper component 1002, according to an example implementation. Robotic gripping device 1000 may be similar to robotic gripping devices 400, 500, and/or 800. Preshaper component 1002 may include members 1006A-B rotatably coupled end-to-end through a joint 1004. Joint 1004 may include a pivot joint, circular joint, rolling joint, or other type of joint. Members 1006A-B may be rotatably coupled to fingers 1012A-B respectively at joints 1008A-B, which may be pivot joints, rolling joints, circular joints, or other types of joints.

Figure 10B:
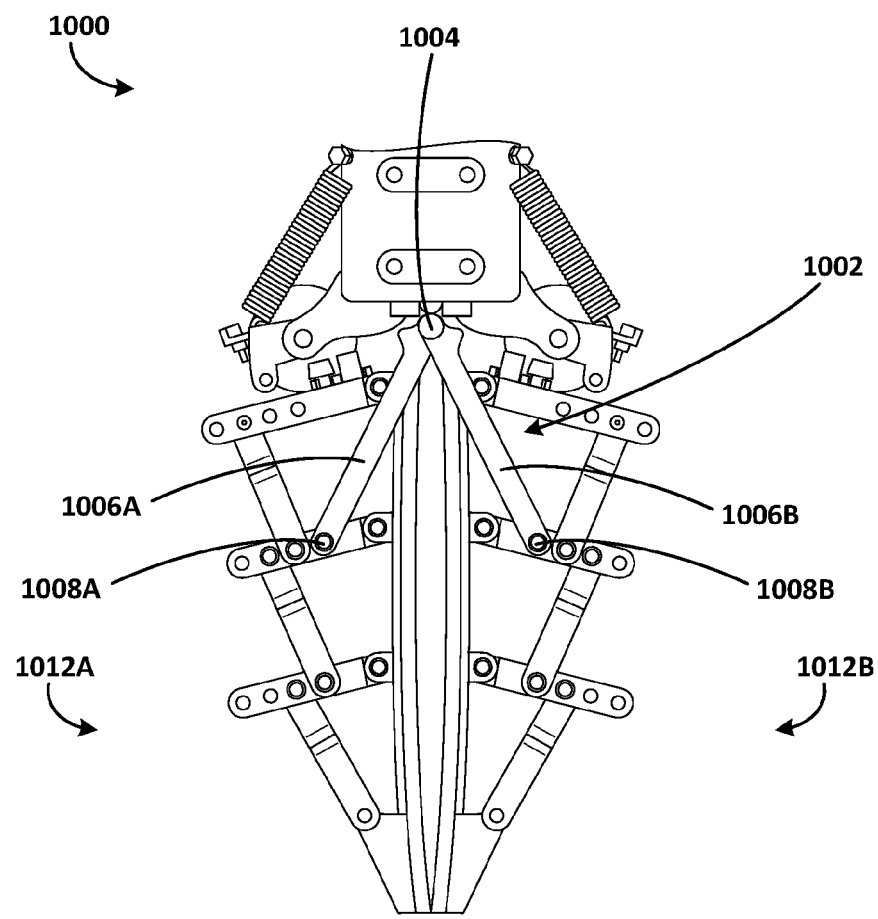
FIG. 10B illustrates the example robotic gripping device of FIG. 10A in a closed position according to an example implementation.

FIG. 10A illustrates robotic gripping device 1000 with preshaper component 1002 in a disengaged state. FIG. 10B illustrates robotic gripping device 1000 and disengaged preshaper component 1002 in a closed stated. When the fingers of robotic gripping device 1000 are actuated, causing the fingers to close, members 1006A-B bend at joint 1004, preventing preshaper component 1002 from causing the fingers 1012A-B to bend or deform.

Figure 11A:
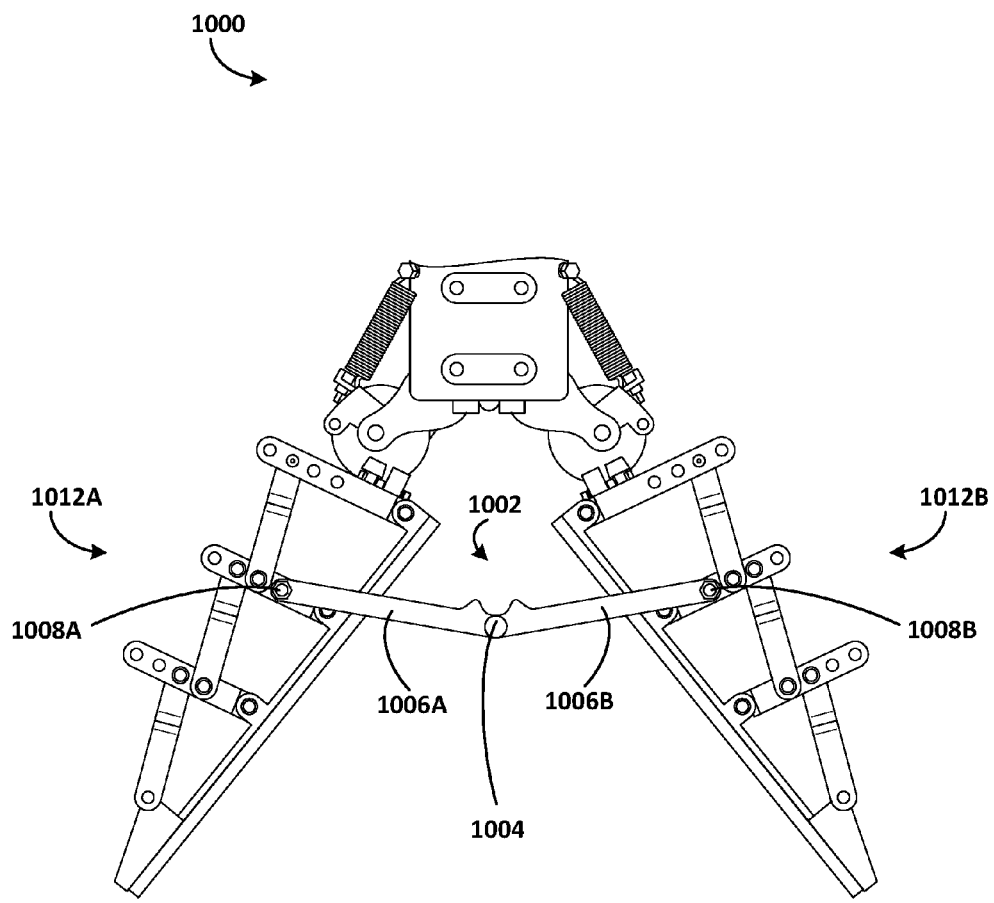
FIG. 11A illustrates an example robotic gripping device in an open position with the second type of preshaper component in an engaged state, according to an example implementation.
Figure 11B:
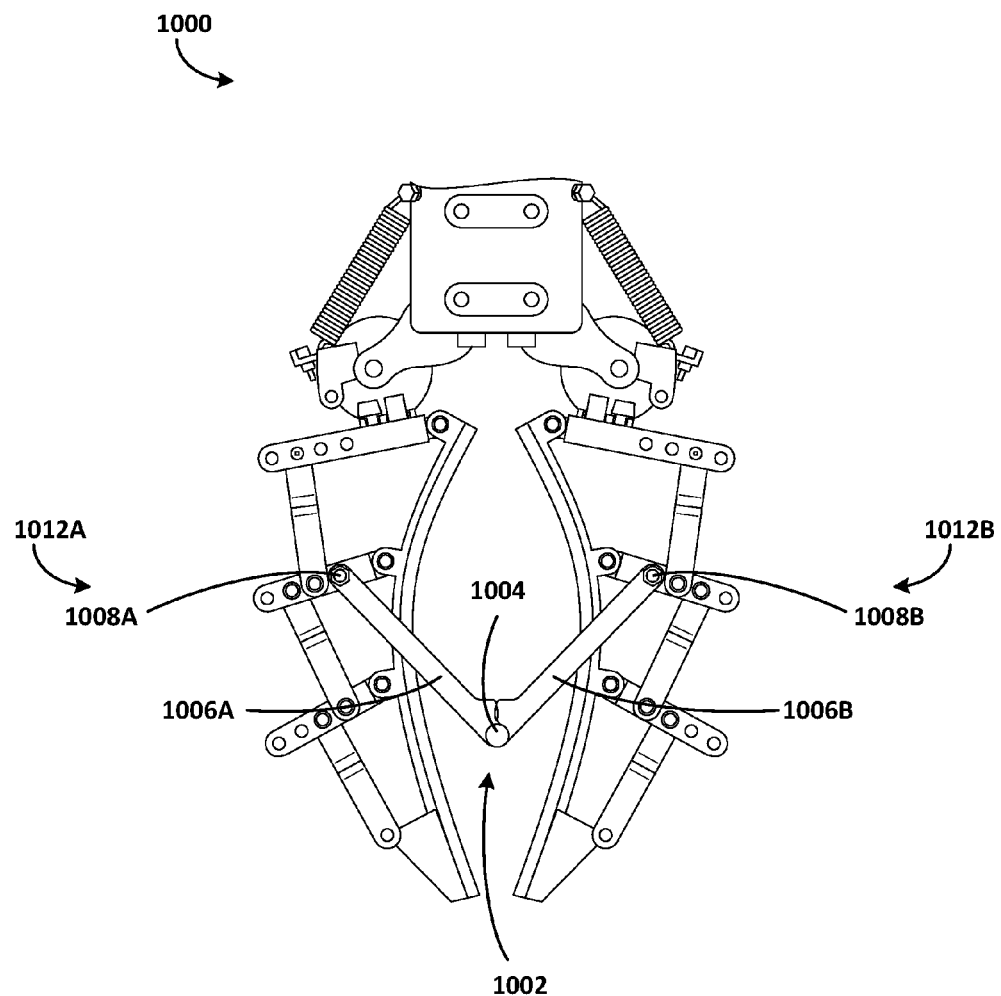
FIG. 11B illustrates the example robotic gripping device of FIG. 11A in a closed position according to an example implementation.

FIG. 11A illustrates robotic gripping device 1000 with preshaper component 1002 in an engaged state. In some examples, the preshaper component 1002 may be engaged by opening the fingers to a width that is not typically reached. In this manner, the actuator that actuates the fingers 1012A-B may also engage or disengage the preshaper component. In the engaged state, a slight angle is developed between members 1006A-B. FIG. 11B illustrates robotic gripping device 1000 and engaged preshaper component 1002 in a closed state. When the fingers of robotic gripping device 1000 are actuated, causing the fingers to close, members 1006A-B bend at joint 1004 such that they are stopped from further rotating. As a result, further actuation of the fingers causes member 1006A-B to impart a force on fingers 1012A-B. The imparted force may act on outward facing members of the fingers, which may be coupled to the deformable gripping surfaces of the fingers. Thus, when the fingers are actuated and a force is imparted on the fingers, the deformable gripping surfaces deform in a manner similar or identical to that described above with reference to FIGS. 4, 5 and 8.

b. Example Coupling Mechanism

Figure 12:
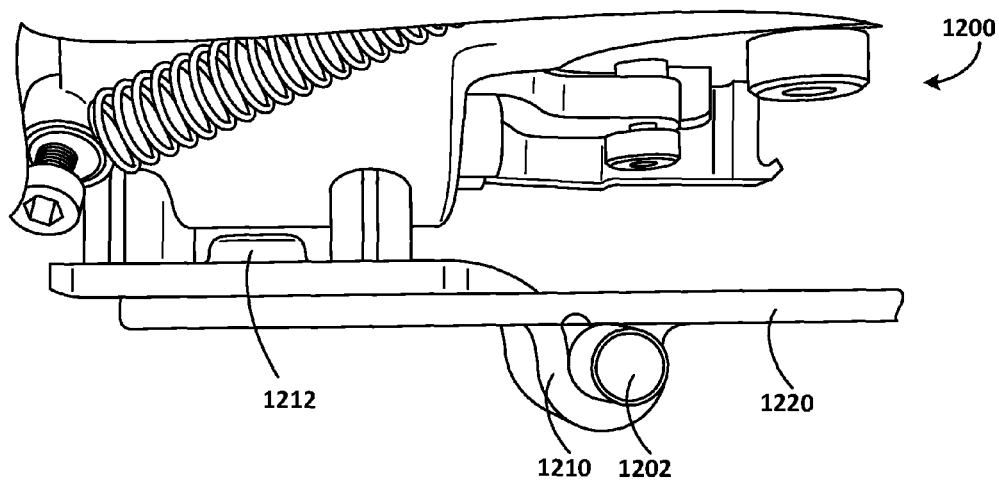
FIG. 12 illustrates a side view of an example coupling mechanism, according to an example implementation.
Figure 13:
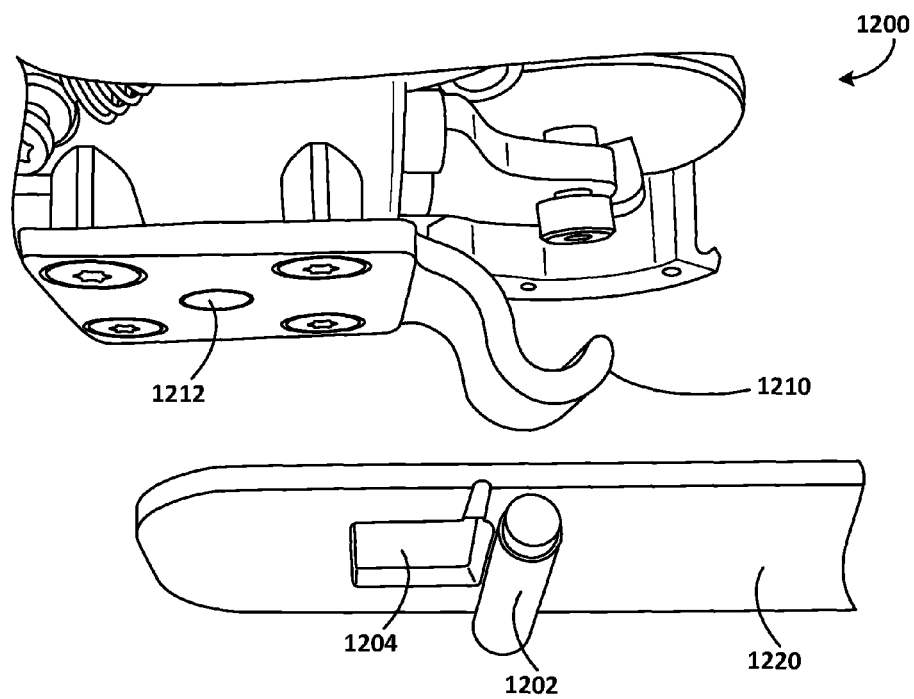
FIG. 13 illustrates another side view of the example coupling mechanism of FIG. 12, according to an example implementation.

FIGS. 12 and 13 illustrate a coupling mechanism between robotic gripping device 1200 and elongated member 1220, which may include a preshaper component. Robotic gripping device 1200 may be similar to robotic gripping devices 400, 500, 800 and/or 1000. The coupling mechanism may include elongated member 1220, which may include a pin 1202 and an opening 1204. Elongated member 1220 may be similar or identical to the elongated member 520 shown in FIGS. 5-6. The coupling mechanism may also include robotic gripping device 1200, which may include a hook 1210 and a magnet 1212. The elongated member 1220 may be coupled to the robotic gripping device 1200 by passing the hook 1210 through the opening 1204, such that the pin 1202 fits into the hook 1210. In some examples, elongated member 1220 may be a magnetic material, or may have a magnetic part, such that magnet 1212 can provide a force on elongated member 1220. In this way, the coupling mechanism may provide a more secure connection between the robotic gripping device and the elongated member.

In some examples, the coupling mechanism may include Velcro or a friction fit. Further, other types of coupling mechanisms may be used to couple the preshaper component(s) to the robotic gripping device.

c. Alternative Finger Arrangement

In some examples, the deformable surface of the fingers may be on the outside of the finger, facing away from the center of the fingers. In this case, the preshaper component may be positioned outside the fingers, such that when the fingers are actuated, the deformable gripping surfaces are deformed such that fingertips (and/or fingernails) bend away from each other. This arrangement may be useful for gripping certain objects such as a jug or canister, by gripping the object from the inside.

VII. Conclusion

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

The invention claimed is:

1. A robotic gripping device comprising:
   two opposable fingers, wherein each of the two opposable fingers has a deformable gripping surface, a base, and a fingertip;
   an actuator coupled to the base of each of the two opposable fingers, wherein the actuator is configured to move the two opposable fingers toward and away from each other;
   an elongated member coupled to a coupling mechanism on the robotic gripping device, wherein the elongated member extends along an axis that bisects an angle between the two opposable fingers; and
   a preshaper component positioned on the elongated member such that the preshaper component is between the two opposable fingers, wherein when the two opposable fingers are moved toward each other by the actuator and the deformable gripping surface of each of the two opposable fingers contacts the preshaper component, the deformable gripping surface of each of the two opposable fingers is deformed by the preshaper component such that the fingertips of each of the two opposable fingers are curled inward toward each other, wherein when the preshaper component is positioned on the axis at a first position and the two opposable fingers are closed to a first angle, the deformable gripping surface of each of the two opposable fingers is deformed by a first amount, and wherein when the preshaper component is positioned on the axis at a second position that is farther from the base of the two opposable fingers than the first position, and the two opposable fingers are closed to the first angle, the deformable gripping surface of each of the two opposable fingers is deformed by a second amount that is less than the first amount.

2. The robotic gripping device of claim 1, wherein the preshaper component is cylindrical.

3. The robotic gripping device of claim 1, wherein the preshaper component is asymmetric, such that a first surface of the preshaper component that contacts the deformable gripping surface of a first finger of the two opposable fingers has a different shape than a second surface of the preshaper component that contacts the deformable gripping surface of a second finger of the two opposable fingers.

4. The robotic gripping device of claim 1, wherein the two opposable fingers further comprise outward facing members coupled to respective deformable gripping surfaces of the two opposable fingers, each outward facing member having a plurality of sections coupled end-to-end through respective joints, wherein when the deformable gripping surface of each of the two opposable fingers is deformed by the preshaper component, the outward facing members bend at the respective joints such that the outward facing members cause the fingertip of each of the two opposable fingers to curl inward toward each other.

5. A method comprising:

identifying an object for a robotic gripping device to grasp, wherein the robotic gripping device comprises one or more fingers each having a deformable gripping surface, a base, and a fingertip;

determining, based on one or more characteristics of the identified object, to position a preshaper component proximate to the one or more fingers of the robotic gripping device before grasping the identified object;

selecting the preshaper component from a plurality of preshaper components each having a different shape;

positioning the preshaper component proximate to the one or more fingers;

actuating the one or more fingers to move toward the preshaper component such that the deformable gripping surface of each of the one or more fingers contacts the preshaper component and the fingertip of each of the one or more fingers curls around the preshaper component; and while the deformable gripping surface of each of the one or more fingers is in contact with the preshaper component, further actuating the one or more fingers to cause the one or more fingers to grasp the identified object.

6. The method of claim 5, wherein identifying the object for the robotic gripping device to grasp comprises identifying a handle of the object, and wherein further actuating the one or more fingers comprises actuating the one or more fingers such that the fingertip of each of the one or more fingers curls around the identified handle without making contact with the identified handle.

7. The method of claim 5, wherein the plurality of preshaper components are coupled to the robotic gripping device.

8. The method of claim 5, wherein the preshaper component comprises a rectangular shape.

9. The method of claim 5, wherein the one or more fingers comprise two fingers, wherein the preshaper component is asymmetric such that a first surface of the preshaper component that contacts the deformable gripping surface of a first finger of the two fingers has a different shape than a second surface of the preshaper component that contacts the deformable gripping surface of a second finger of the two fingers.

10. The method of claim 5, wherein the one or more fingers comprise two fingers arranged opposite each other, wherein positioning the preshaper component proximate to the two fingers comprises:

determining, based on the one or more characteristics of the identified object, a position to position the preshaper component along an axis that bisects an angle between the two fingers; and positioning the preshaper component at the determined position.

11. A robotic device comprising:

an end effector, wherein the end effector comprises (i) two fingers, wherein each of the two fingers has a deformable gripping surface, a base, and a fingertip, and (ii) an actuator coupled to the base of each of the two fingers;

one or more preshaper components; and a control system configured to control the robotic device, wherein the control system comprises:

one or more processors;

a non-transitory computer-readable memory; and program instructions stored on the non-transitory computer-readable memory and executable by the one or more processors to:

identify an object for the end effector to grasp;

determine, based on one or more characteristics of the identified object, to position a preshaper component between the two fingers of the end effector before grasping the identified object;

position the preshaper component between the two fingers;

actuate the two fingers to move toward each other such that the deformable gripping surfaces of the two fingers contact the preshaper component and the fingertips of the two fingers curl inward toward each other; and while the deformable gripping surfaces of the two fingers are in contact with the preshaper component, further actuate the two fingers to move toward each other to cause the two fingers to grasp the identified object.

12. The robotic device of claim 11, wherein the control system is further configured to:

determine a height of the identified object above a surface on which the identified object is resting;

determine that the height of the identified object is below a threshold height; and determine to position the preshaper component between the two fingers of the end effector before grasping the identified object in response to determining that the height of the identified object is below the threshold height.

13. The robotic device of claim 11, wherein the control system is further configured to select the preshaper component from a plurality of preshaper components each having a different shape.

14. The robotic device of claim 13, wherein the plurality of preshaper components are coupled to the robotic device.

15. The robotic device of claim 11, wherein the preshaper component comprises a U-shape.

16. The robotic device of claim 11, wherein the preshaper component is asymmetric such that a first surface of the preshaper component that contacts the deformable gripping surface of a first finger of the two fingers has a different shape than a second surface of the preshaper component that contacts the deformable gripping surface of a second finger of the two fingers.

17. The robotic device of claim 11, wherein the control system is further configured to determine, based on the one or more characteristics of the identified object, where to position the preshaper component along an axis that bisects an angle between the two fingers.

* * * * *